Figure 1:
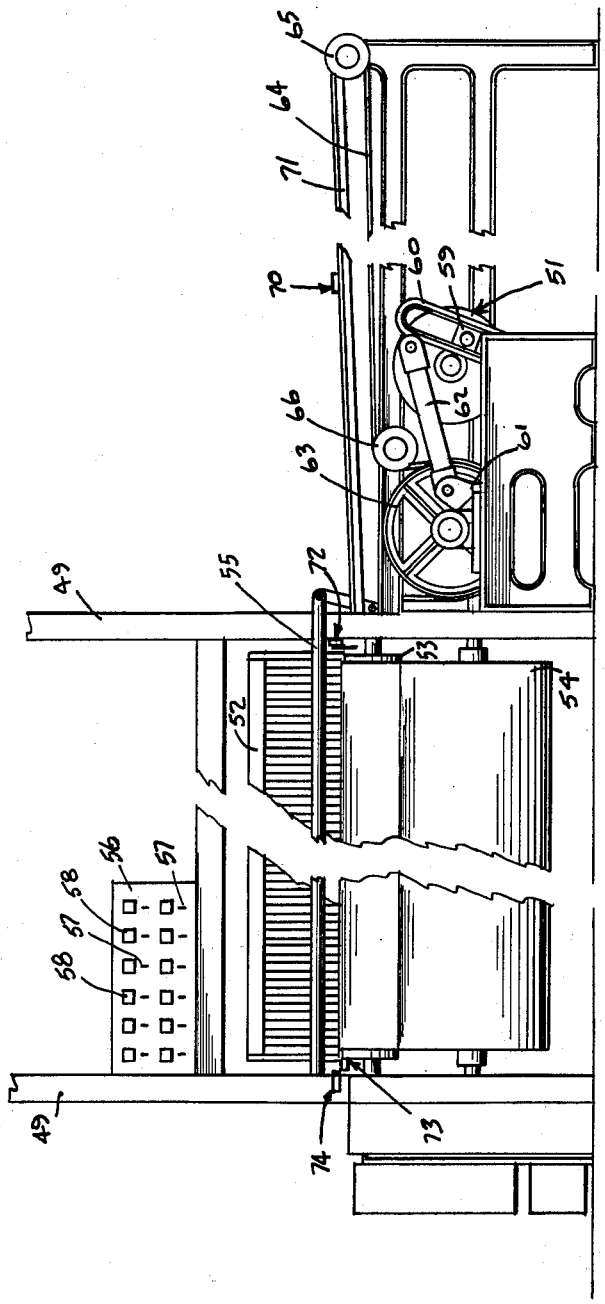

June 2, 1964   C. B. ABELSMA   3,135,299
CONTROL SYSTEM FOR PILE WIRE LOOMS
Filed Nov. 9, 1961   14 Sheets-Sheet 2

INVENTOR.
CORNELIS B. ABELSMA
BY
Hyde W. Ballard

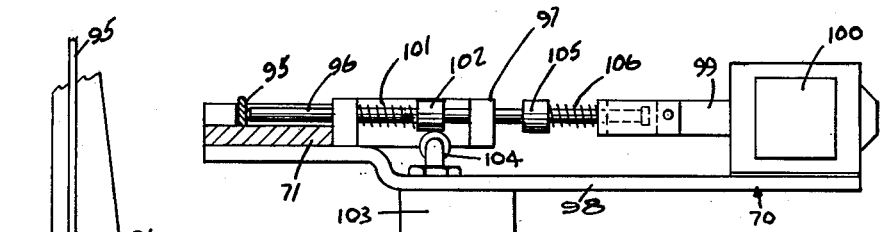
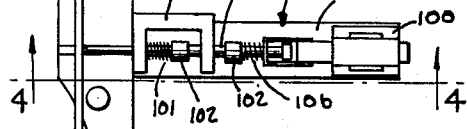
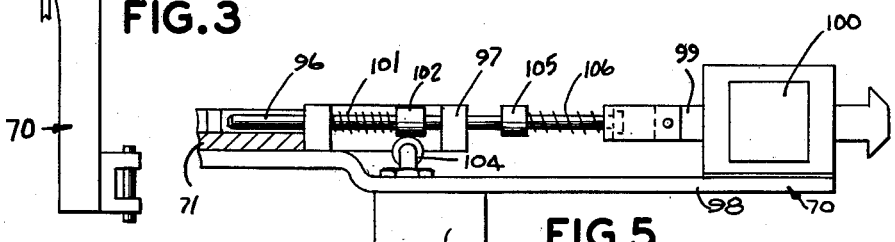
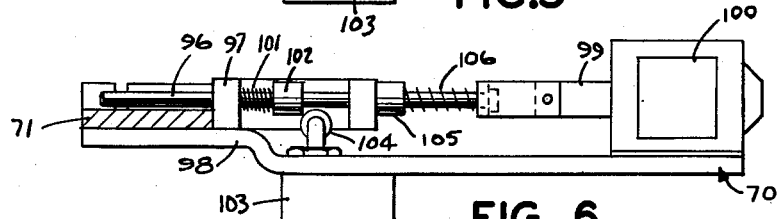
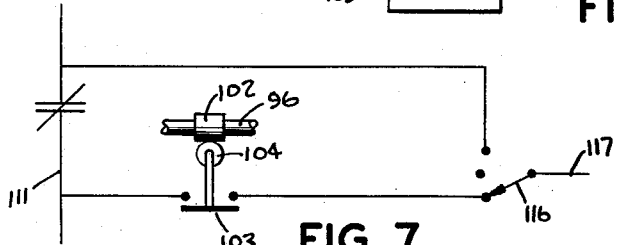
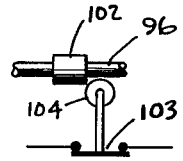
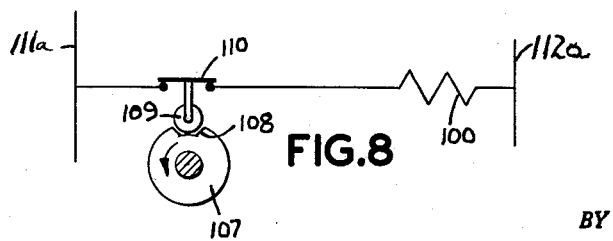
INVENTOR.
CORNELIS B. ABELSMA
BY June 2, 1964   C. B. ABELSMA   3,135,299
CONTROL SYSTEM FOR PILE WIRE LOOMS
Filed Nov. 9, 1961   14 Sheets-Sheet 4

INVENTOR.
CORNELIS B. ABELSMA
BY

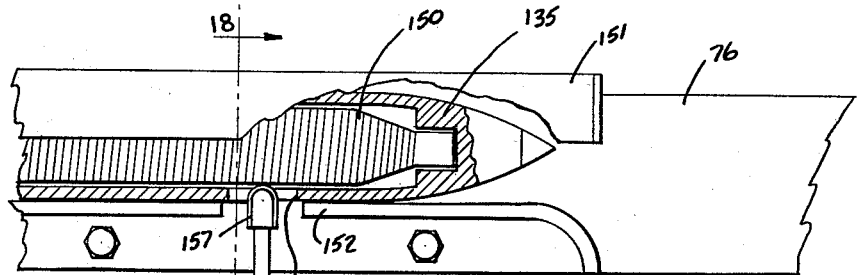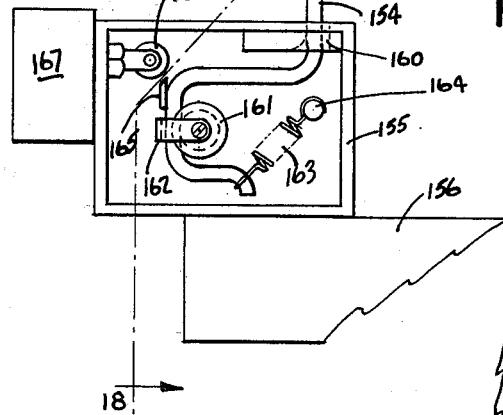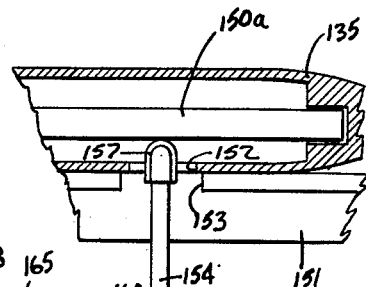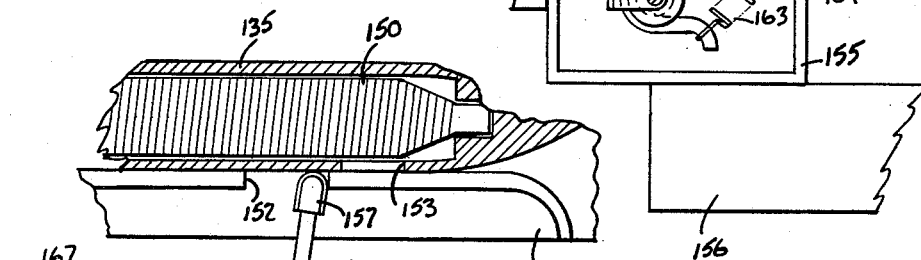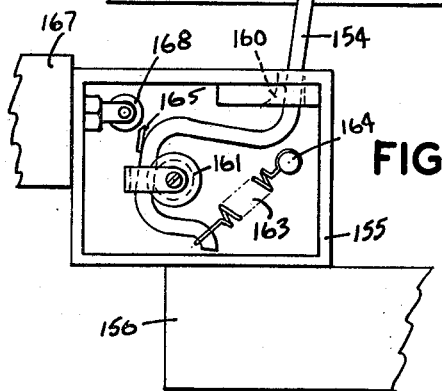

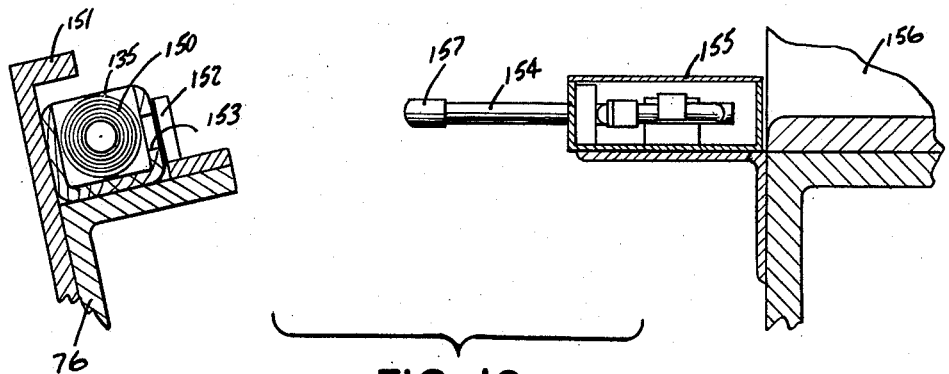
FIG. 18
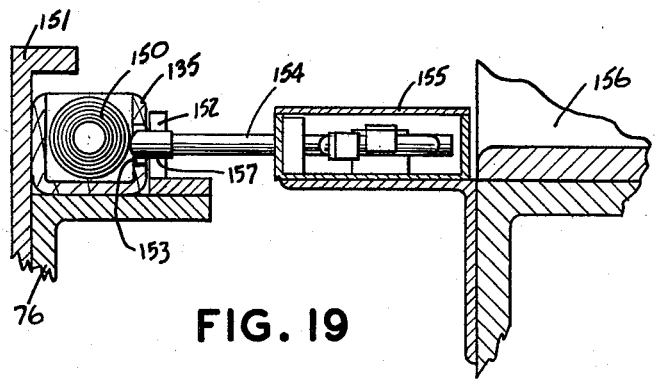
FIG. 19
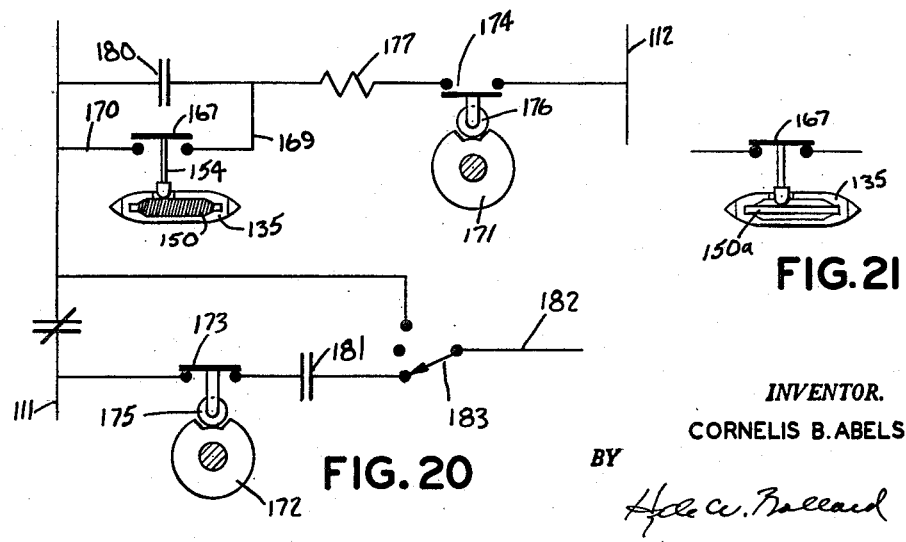
FIG. 20
FIG. 21
INVENTOR.
CORNELIS B. ABELSMA June 2, 1964  C. B. ABELSMA  3,135,299
CONTROL SYSTEM FOR PILE WIRE LOOMS
Filed Nov. 9, 1961  14 Sheets-Sheet 7

INVENTOR.
CORNELIS B. ABELSMA
BY
Halce W. Ballard

June 2, 1964     C. B. ABELSMA     3,135,299
CONTROL SYSTEM FOR PILE WIRE LOOMS

Filed Nov. 9, 1961     14 Sheets-Sheet 9

INVENTOR.
CORNELIS B. ABELSMA
BY
Hyde W. Ballard

June 2, 1964  C. B. ABELSMA  3,135,299
CONTROL SYSTEM FOR PILE WIRE LOOMS
Filed Nov. 9, 1961  14 Sheets-Sheet 10

INVENTOR.
CORNELIS B. ABELSMA
BY
Hyde W. Ballard

June 2, 1964 C. B. ABELSMA 3,135,299
CONTROL SYSTEM FOR PILE WIRE LOOMS
Filed Nov. 9, 1961 14 Sheets-Sheet 12

INVENTOR.
CORNELIS B. ABELSMA
BY
Hyde W. Ballard

June 2, 1964  C. B. ABELSMA  3,135,299
CONTROL SYSTEM FOR PILE WIRE LOOMS
Filed Nov. 9, 1961  14 Sheets-Sheet 13

INVENTOR.
CORNELIS B. ABELSMA
BY
Hyde W. Ballard

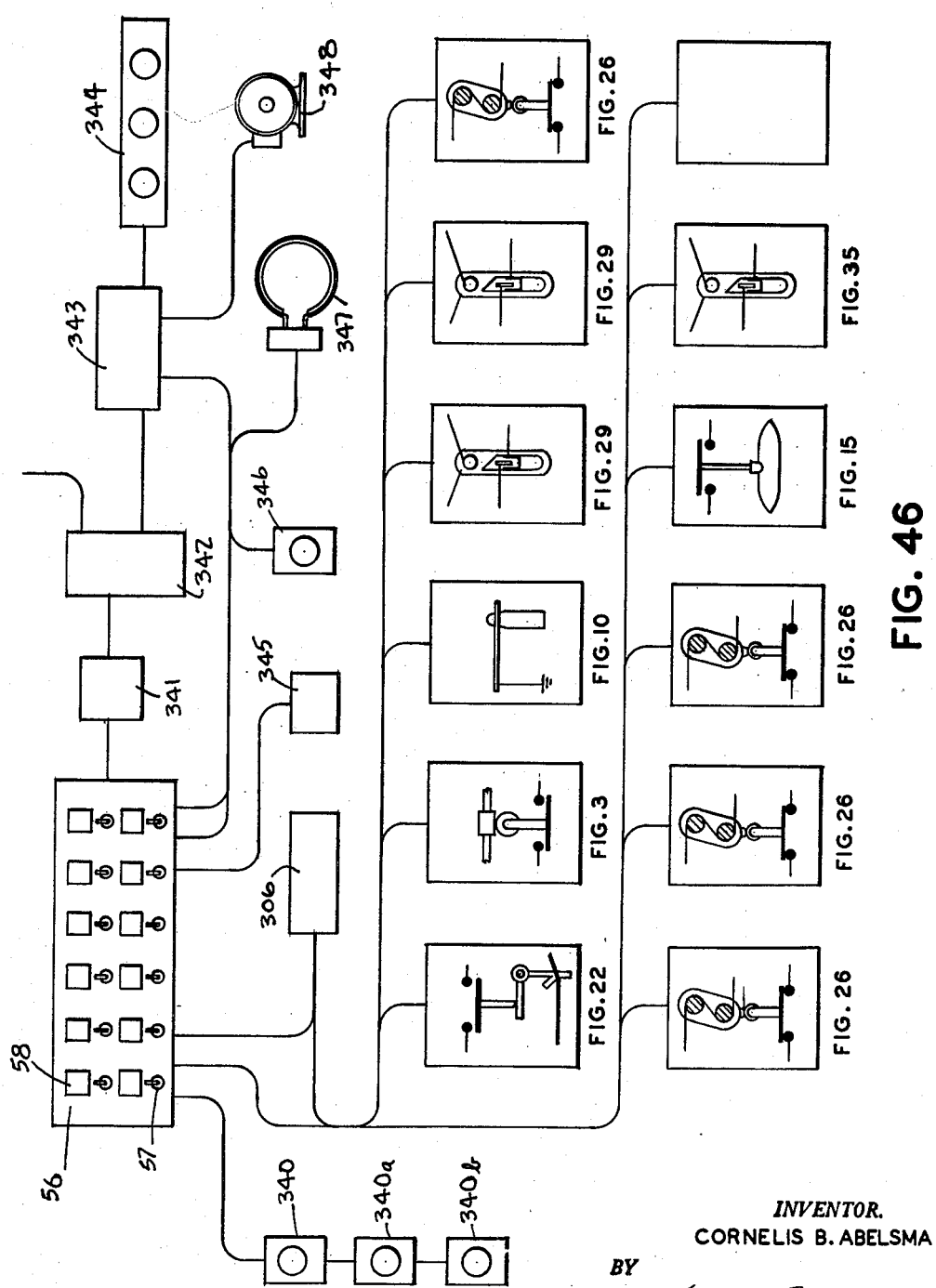

United States Patent Office 3,135,299
Patented June 2, 1964

3,135,299
CONTROL SYSTEM FOR PILE WIRE LOOMS
Cornelis B. Abelsma, Buena Vista, Va., assignor to James Lees and Sons Company, Bridgeport, Pa., a corporation of Delaware
Filed Nov. 9, 1961, Ser. No. 151,287
6 Claims. (Cl. 139—336)

This invention relates to transverse wire pile looms and more particularly to an improved Wilton and velvet pile fabric loom which is equipped with a plurality of stop motion devices for controlling and stopping the loom in the event of any given malfunction.

It is well known that looms and particularly carpet looms have heretofore been equipped with a variety of stop motion devices which stop the operation of the loom in the event that a specific malfunction occurs. However, none of these devices has heretofore been integrated into a unitary control system for the loom which without fail gives the weaver the chance to determine and locate the particular fault or condition requiring correction at a glance. A particularly important feature of the present invention is to design certain of the stop motion mechanisms in such a way that they will only stop the loom and give a proper indication when the predetermined cause for the actuation of the stop motion occurs. A second important feature of the stop motion devices described herein resides in the fact that in the event a malfunction of a type not intended to actuate the particular stop motion occurs, no part of the loom will be damaged. This is significant with regard to stop motion devices in the area through which the shuttle operates. A primary object of the invention, therefore, is to provide an integrated control system for a broad Wilton or velvet loom in which several stop motion devices are sensed in timed relation to give suitable indications at a central location or panel.

A further object of the invention is to provide in a broad Wilton or velvet loom an improved skim wire stop motion which will not be damaged in the event that there is an imperfect or improper pick of the shuttle.

A further object of the invention is to provide a stop motion device for a broad Wilton and Velvet loom in which the amount of filling in the shuttle is detectable on alternate picks and in which the filling cop detector is not damaged in the event that there is an imperfect or incomplete pick which fails to seat the shuttle all the way in the shuttle box.

A still further object of the invention is to provide an improved stop motion device for the pile warps in a broad pile fabric loom which is not affected by vibration of the loom and the harnesses.

A still further object of the invention is to provide an integral sensing device and electrical circuit for all of the required stop motion devices in a broad pile fabric loom.

Figure 2:
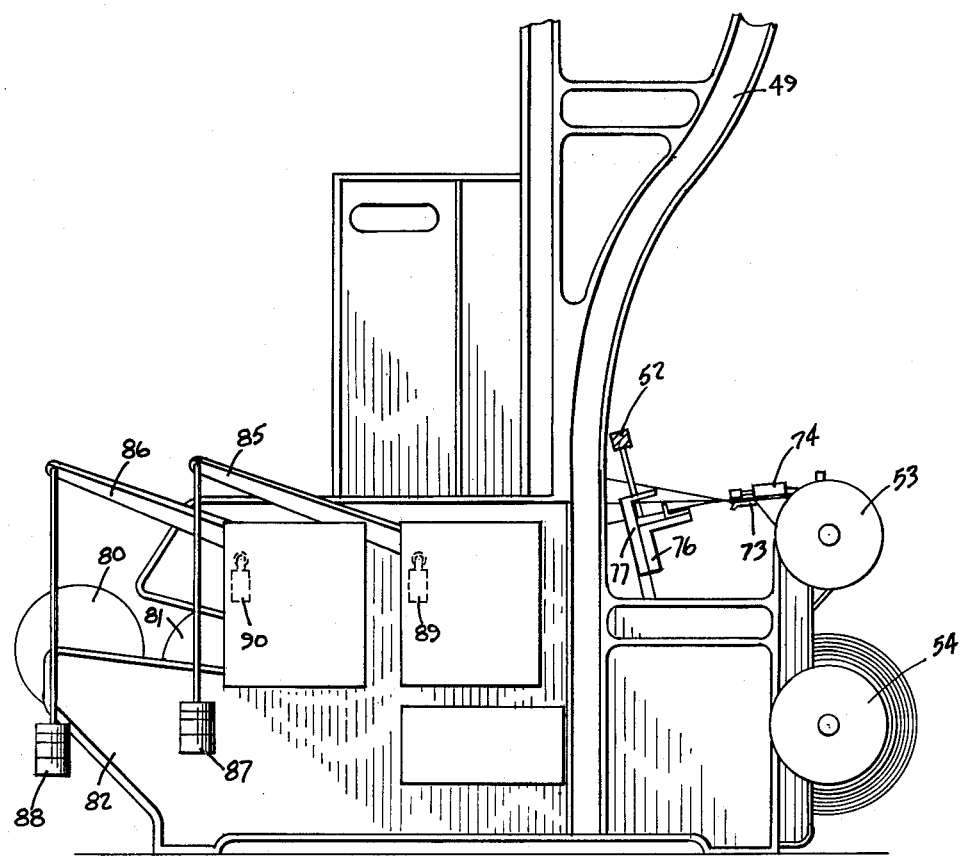
Figure 10:
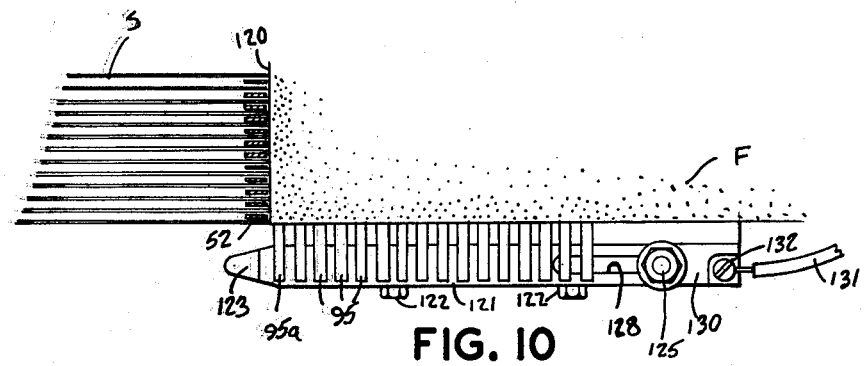
Figure 11:
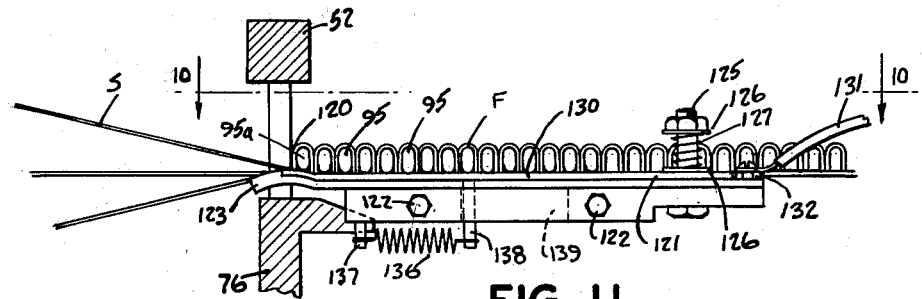
Figure 12:
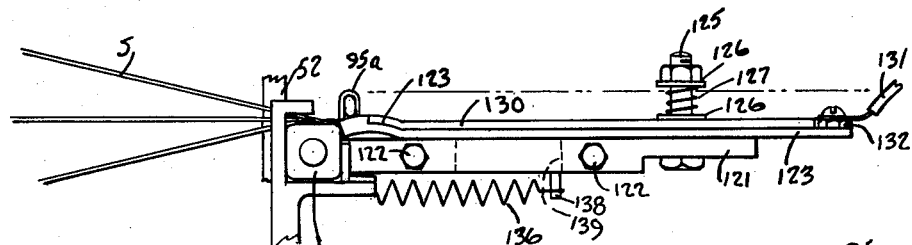
Figure 13:
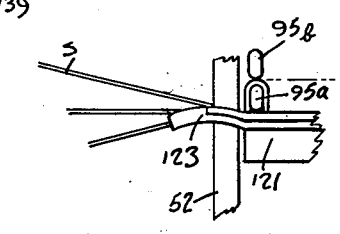
Figure 14:
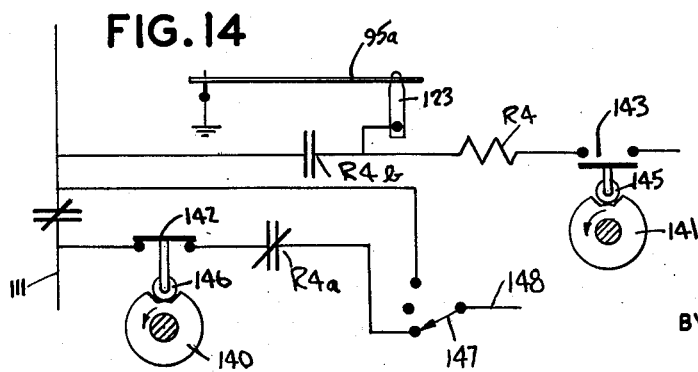
Figure 22:
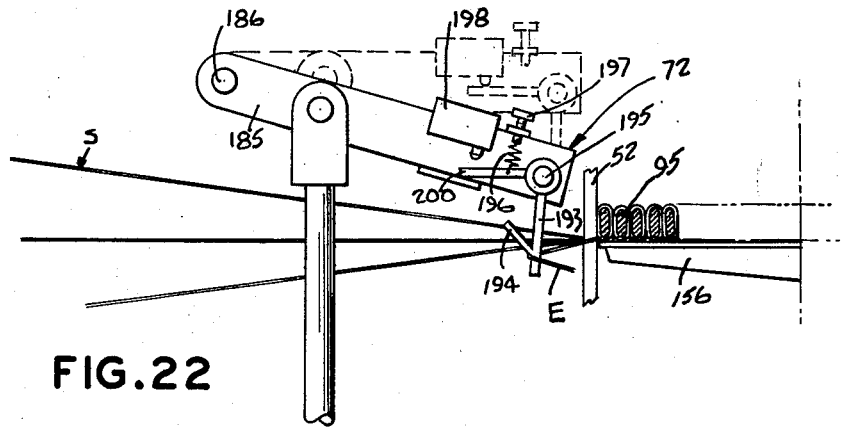
Figure 23:
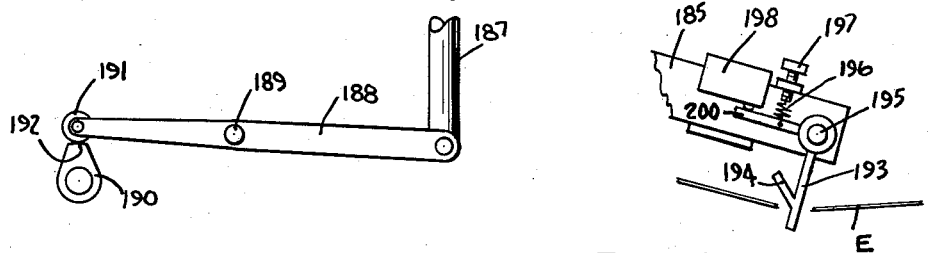
Figure 24:
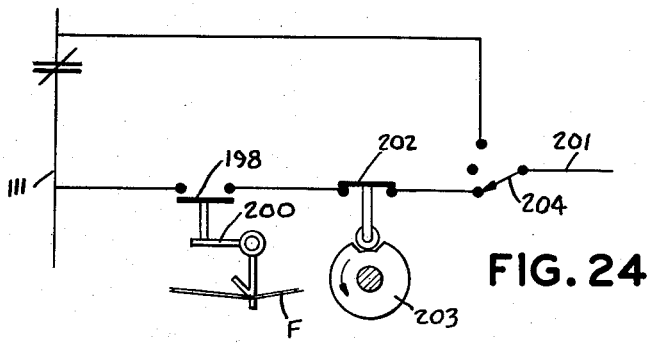
Figure 25:
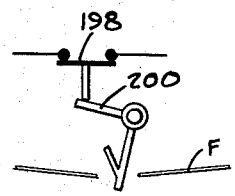
Figure 26:
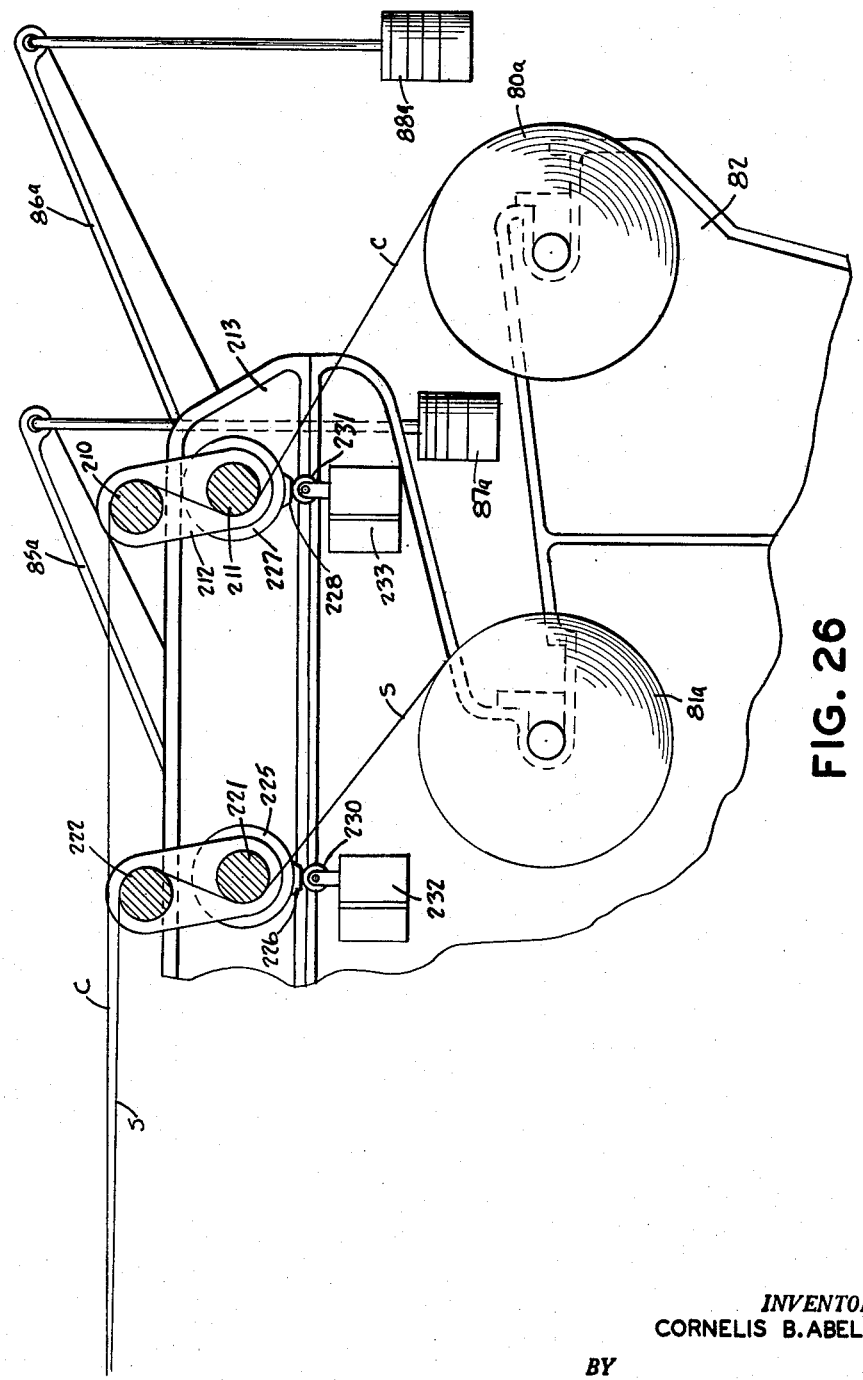
Figure 27:
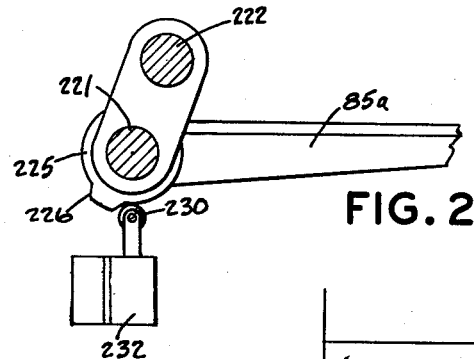
Figure 28:
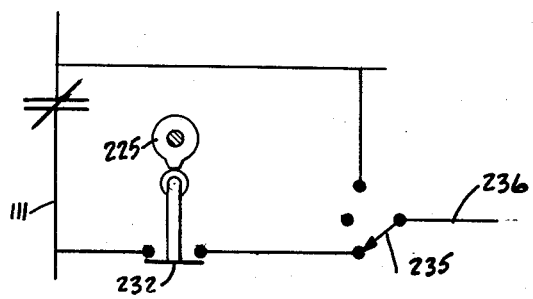
Figure 29:
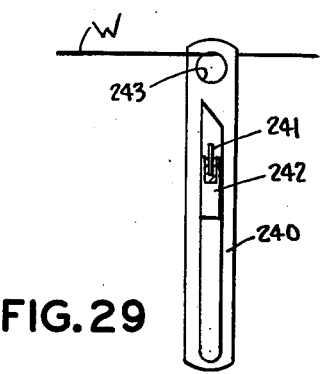
Figure 30:
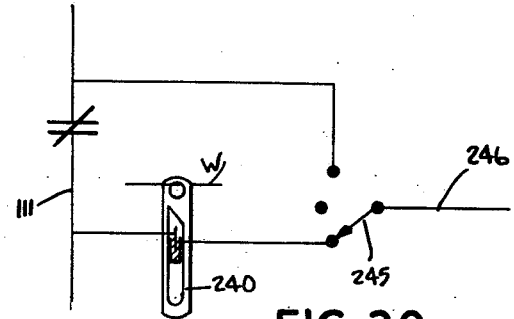
Figure 31:
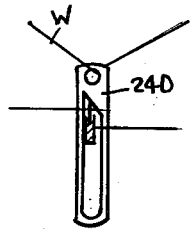
Figure 33:
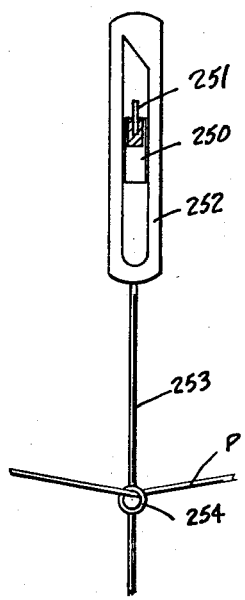
Figure 32:
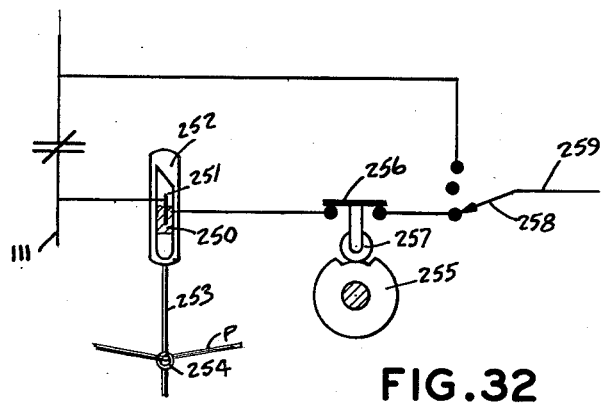
Figure 34:
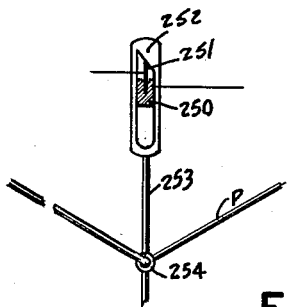
Figure 35:
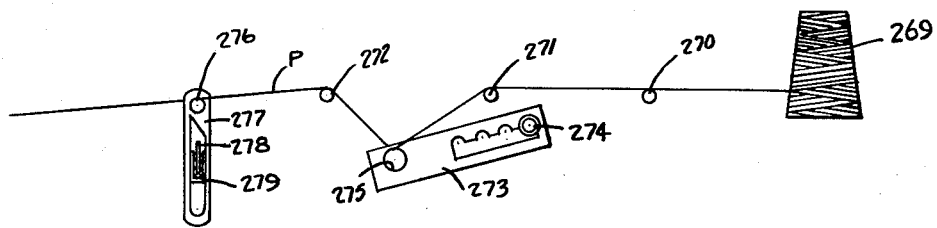
Figure 36:
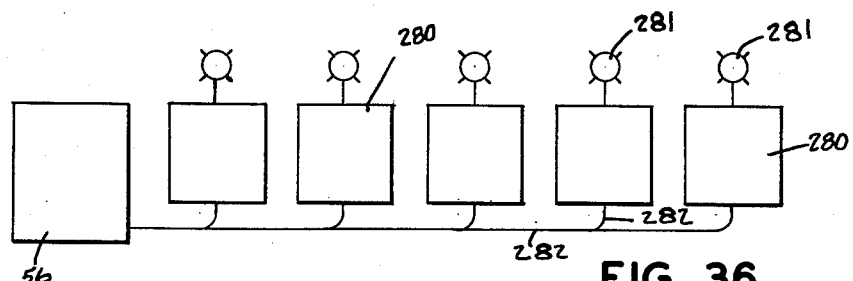
Figures 37, 38:
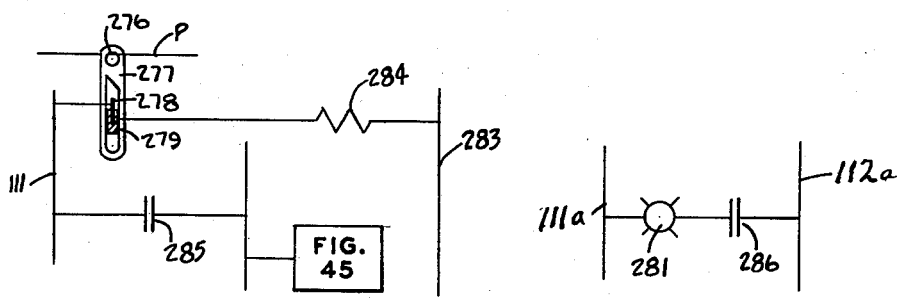
Figure 39:
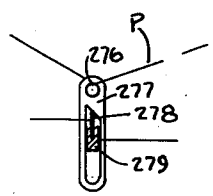
Figures 40, 41:
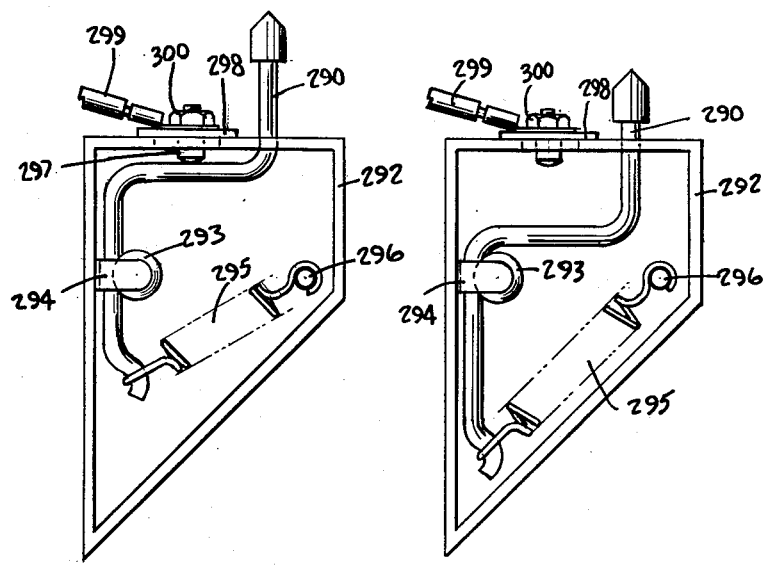
Figure 42:
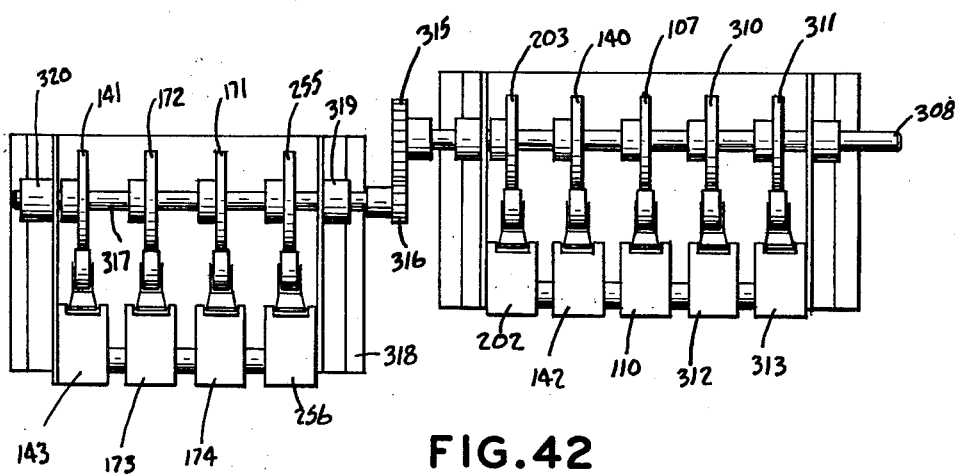
Figure 43:
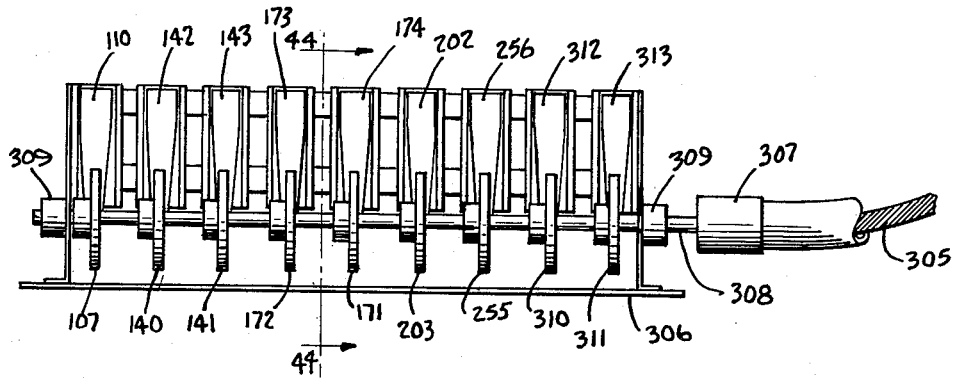
Figure 44:
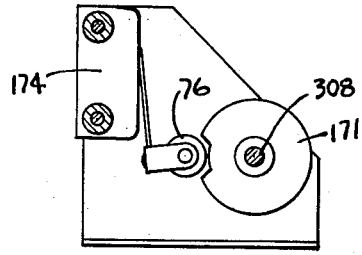
Figure 45:
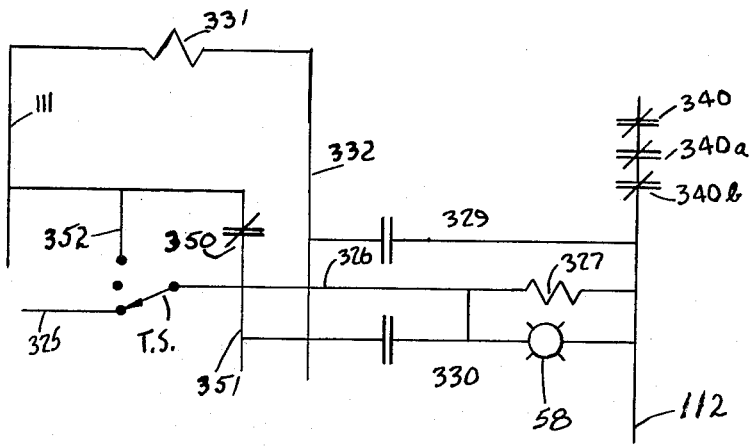

Further objects will be apparent from the specification and drawings in which:

FIG. 1 is a schematic front view of a broad velvet loom showing the wire motion and the central indicating panel for the various stop motions, FIG. 2 is a schematic side view of the loom shown in FIG. 1 which may, also, include the jacquard which has been omitted in FIGS. 1 and 2, in the case of a Wilton loom, FIG. 3 is a top view showing the miss wire stop motion for the detector mechanism, FIG. 4 is a section as seen at 4—4 of FIG. 3, FIG. 5 is a view similar to FIG. 4 showing the detector plunger normally retracted to permit entry of the pile wire in the wire slide, FIG. 6 shows the structure of FIG. 4 at the sensing position but with no wire in its proper place, FIG. 7 is a wiring diagram for the sensing circuit of the miss wire detector with the wire in proper position, FIG. 8 is a partial wiring diagram showing the timing cam and the switch controlled thereby, FIG. 9 is a fragmentary view showing the plunger cam in the position corresponding to FIG. 6 in which the sensing switch is permitted to close, thus completing the stop motion circuit for the miss wire detector, FIG. 10 is a fragmentary top view of a portion of the loom near the fell of the fabric showing the skim wire detecting mechanism, FIG. 11 is an end view of the structure of FIG. 10, FIG. 12 is a view similar to FIG. 11 showing the operation of the skim wire detector in the event the shuttle fails to seat all the way in the shuttle box, FIG. 13 is a fragmentary view showing the position of various parts of the detector in the event of a skim wire as distinguished from the normal positioning of FIG. 11, FIG. 14 is a circuit diagram showing the electrical connections for the skim wire detector, FIG. 15 is a fragmentary top view showing the filling cop detector in normal operating position with a full cop, FIG. 16 shows how the filling cop detector is actuated when the cop is empty, FIG. 17 is a view showing the manner in which the filling cop detector is displaced without damage in the event the shuttle does not fully seat in the shuttle box, FIG. 18 is a fragmentary sectional detail as seen at 18—18 of FIG. 15, FIG. 19 shows the mechanism of FIG. 18 in the position corresponding to FIG. 15 when the lay has completed a beat-up, FIG. 20 is a circuit diagram showing the cooperation of the various components of FIGS. 15-19 with regard to the electrical circuits, FIG. 21 shows the actuation of the sensing switch when the shuttle has an empty filling cop, FIG. 22 is a fragmentary end view of the broken filling detector in normal operation, FIG. 23 shows a portion of the structure of FIG. 22 in the event of a broken filling, FIG. 24 shows the electrical circuits used in conjunction with the broken filling detector, FIG. 25 shows the sensing switch of FIG. 24 in the position caused when the filling breaks, FIG. 26 is a fragmentary view of a portion of the loom showing two of the jumbos or whip rolls for applying tension to the binder and stuffer warps together with the sensing mechanism for stopping the loom in the event the tension on either the stuffer or binder warps increases or decreases beyond a predetermined point, FIG. 27 is a fragmentary view of a portion of the structure of FIG. 26 showing the position of the jumbo rolls and brackets for actuating the detecting switch in the event of excessive tension, FIG. 28 is a wiring diagram for the sensing mechanism shown in FIGS. 26 and 27, FIG. 29 shows one of the conventional drop wires for detecting the presence of a broken warp or slack tension in the warp ends after passing through the jumbos, FIG. 30 shows the wiring diagram for the drop wire of FIG. 29, FIG. 31 shows the position of the drop wire in the event of slack tension caused by a broken end or otherwise, FIG. 32 is a partial schematic diagram showing one of the face yarn drop wires and control circuits for a velvet loom, FIG. 33 is an enlarged detail of the face yarn drop wire of FIG. 32 in the normal operating position, FIG. 34 shows the drop wire of FIG. 33 in the position resulting from a broken end, FIG. 35 is a schematic view showing a drop wire applied to the pile yarns as they are fed from a creel, FIG. 36 shows the various sensing circuits and the annunciator box used if the pile yarns are fed from a creel, FIG. 37 is the wiring diagram for the pile drop wire of FIG. 35, FIG. 38 is a portion of the diagram of FIG. 37, FIG. 39 shows the drop wire of FIGS. 35 and 37 in a closed-circuit condition, FIG. 40 is a modified form of filling cop detector in the unactuated position, FIG. 41 shows the filling cop detector of FIG. 40 in the actuated position when the cop is full, FIG. 42 is a schematic view of the various sensing cams, switches, and camshafts for the integrated control system, FIG. 43 is a view similar to FIG. 42 with a modified control camshaft, FIG. 44 is a section as seen at 44—44 of FIG. 43, FIG. 45 is a wiring diagram of a typical annunciator circuit, and FIG. 46 is a schematic condensed wiring diagram of the integrated control system constructed in accordance with the present invention.

The invention comprises essentially the provision of an improved control system for Wilton and velvet pile fabric looms which permits substantially automatic operation of the loom insofar as the correction of faults may be considered. The system includes specific improvements in various stop motions which are designed to eliminate false indications and which also confine the stopping of the loom to specific conditions so that the operator may also determine the place to make the correction in the loom or the creel. In the case of the differences between Wilton and velvet looms, the invention includes suitable stop motions at the creel for the Wilton loom as well as proper pile warp stop motions at the loom for velvet beam weaving.

Referring now more particularly to the drawings, a conventional Wilton or velvet loom is shown diagrammatically in FIGS. 1 and 2. Such a loom, for example, comprises a frame 49, a rope motion 51, harness frame or frames 52, carpet pin roll 53, carpet take-up roll 54, shipper handle 55, and a panel board 56 having a plurality of switches 57 and lamps 58 for indicating the particular mechanism on the loom which may have actuated the stop motion. In FIG. 1 the conventional rope motion 51 for inserting and withdrawing the pile wires comprises a crank 59, an oscillating arm 60, which is connected to a segment rack 61 by means of a link 62. Segment 61 oscillates the rope drum 63 back and forth to control the hopper plate, not shown, through a rope or cable 64 running around a series of pulleys 65, 66.

The miss wire detecting assembly 70 is shown positioned on the wire slide 71. The broken filling detector 72 positioned at the righthand selvedge is shown in FIG. 1. The skim wire detector 73 as well as the cop detector 74 are positioned at the lefthand selvedge as seen in FIG. 1. The lay 76 (FIG. 2) which carries the reed 52 oscillates back and forth through the shed in the regular manner to beat up the wefts and the pile wires against the fell of the fabric. In FIG. 2 the left end of the lay 76 is provided with the usual shuttle box shown generally at 77.

At the rear of the loom the warp beams 80 and 81 are mounted at the rear loom framework 82 and these beams carry the binder and stuffer warps both for Wilton and velvet weaving. These warps are threaded around individual jumbos which supply the desired tension. The jumbos comprise parallel arms journaled in brackets that will be described more fully hereinafter and each of the brackets is provided with a long lever 85 and 86 on the end of which suitable weights 87 and 88 are suspended. Excessive tilting of the jumbos due to the weights 87 and 88 causes microswitches 89 and 90 to become actuated thus stopping the loom and providing an indication on the panel 56. In the case of Wilton looms, the loom frames 49 extend upwardly and support a jacquard mechanism for controlling the pile yarns individually. In the case of a velvet loom, the jacquard is dispensed with and the pile yarns are supplied from additional beams conveniently mounted on the loom framework 82. The details other than those described above from Wilton and velvet pile fabric weaving are well known to those skilled in the art and it is believed unnecessary to further describe such weaving apart from the portions of the loom which particularly pertain thereto.

The pile wires, one of which is shown at 95 in FIG. 4, are sequentially inserted and withdrawn from a pile wire set, each wire being beaten up into the fell of the carpet during the weaving operation. In the event that one of the pile wires breaks or fails to be inserted, I provide a detector device shown in FIGS. 4-9 for indicating this condition and simultaneously stopping the loom. The detector assembly shown in FIG. 3 is mounted on the wire slide 71 approximately halfway between the selvedge and the end of the wire motion. The miss wire detector consists of a plunger 96 slideably mounted in a U-shaped bracket 97, secured to a plate 98, welded or otherwise attached to the bottom of the wire slide 71. Plunger 96 is pinned to the armature 99 of a solenoid 100 so that it is oscillated back and forth in bracket 97 whenever solenoid 100 is energized or de-energized as the case may be. The plunger 96 and the armature 99 are urged to the right as seen in FIGS. 3 and 4 by means of a helical compression spring 101 positioned around the plunger between one leg of the bracket 97 and a collar 102 secured to the plunger. A microswitch 103 is mounted on the plate 98 and is provided with a roller contact 104 which is selectively engageable by the collar 102. A second collar 105 on plunger 96 permits certain overriding of the plunger by the armature when the wire 95 is in its customary position. This overriding action with respect to armature 99 is shown in FIG. 4 and a second helical compression spring 106 provides for the proper tension between the plunger 96 and the armature 99. Spring 106 is somewhat stronger than spring 101 so that in the event of a missing wire the plunger will override and be fully extended as shown in FIG. 6. During all parts of the weaving cycle except at the moment of sensing, the plunger 96 is withdrawn by solenoid 100 as shown in FIG. 5. In this position the tip of plunger 96 clears the wire track occupied by the particular pile wire 95 that is being detected.

FIGS. 3, 4, and 5 show the normal sequence of operation of the miss wire detector when the loom is running properly. FIG. 6 illustrates the position of the detector and plunger in the event that no wire is in its proper place at the time of sensing. In the normal operation of the detector, a cam 107 rotates in timed relation to the operation of the wire motion and this cam is provided with a dwell at 108 as shown in FIG. 8. The cam follower 109 operates a switch 110 which closes a circuit between the electrical leads 111a and 112a in a higher voltage line to energize solenoid 100. The timing of cam 107 with the wire motion is such that a wire 95 should be in position in the wire slide shown in FIGS. 3 and 4 at the moment switch 110 is closed. With the switch 110 closed, solenoid is energized to move the armature 99 to the left. In the event the wire 95 is in its proper position, plunger 96 is stopped when the tip of the plunger strikes the wire and both springs 101 and 106 are compressed and spring 106 will be compressed an amount sufficient to permit any overriding of the armature travel. In the position shown in FIGS.

3 and 4, collar 102 is stopped in alignment with the contact 104 so that switch 103 is maintained open as seen in FIG. 7. During the remainder of the cycle, when cam 107 holds one switch open, the solenoid 100 is de-energized thus permitting spring 101 to hold plunger 96 in the retracted position of FIG. 5. In this position switch 103 is also maintained open. In the event, however, that a wire 95 is not in its proper position at the time of sensing, namely, when switch 110 is closed, the energization of solenoid 100 permits spring 106 to move plunger 96 sufficiently far to the left as shown in FIG. 6 to close switch 103 by displacing collar 102 and permitting the cam follower 104 to rise as shown in FIG. 9. As soon as switch 103 is closed, a circuit is completed from a line 111 through a testing switch 116 and thence to line 117. The effect of completing this circuit will be described more fully in conjunction with the complete wiring diagram of the loom. It will be noted that the construction of the miss wire detector is such that switch 103 is maintained open at all times during the normal operation of the loom and is closed only in the event that there is no wire in position at the time that a wire should be in position. Avoiding the cyclical operation of switch 103 during normal running of the loom is an important feature in preventing faulty readings. Furthermore, the provision of the stronger spring 106 operating against collar 105 controls the displacement of the plunger, and collar 105 is positioned to limit the maximum travel of the plunger by reason of its striking one of the legs on bracket 97 as shown in FIG. 6. The substantial vibration and pounding that occurs at the wire slide due to the movement of the hopper plate and the insertion and withdrawal of the wires is an important feature in the design of a miss wire detector.

Referring now to FIGS. 10–14, the skim wire detector will be described with reference to the features which avoid damage to the loom in the event of an improperly positioned shuttle. The purpose of the skim wire detector is to provide an indication and an opening of the loom operating circuits in the event one of the pile wires upon insertion pierces a portion of the shed or for some other reason does not properly seat in the shed when the reed beats up the wire into the fell. FIGS. 10 and 11 show the fell of the fabric 120 with the reed 52 in the beat-up position. The woven fabric F is being carried across the breast plate and is shown with a series of pile wires 95, 95 inserted therein. A warp yarn shed is designated generally at S and comprises a series of the warp yarns including chain warps, stuffer warps, and pile warps. The skim wire detector proper comprises a rigid bracket 121 of dielectric material secured to the breast beam by means of bolts or screws 122, 122. A conducting shoe 123 is slidably mounted on the top of bracket 121, retained therein by means of a bolt 125 having suitable washers 126, 126 and a compression spring 127. Bolt 125 passes through an elongated slot 128 in shoe 123 to permit displacement of the shoe as will be described more fully hereinafter. The top of shoe 123 is also provided with a dielectric shield or strip 130 so that there is no electrical contact between the shoe 123 and any metallic part of the loom. An electrical connection 131 is secured to the shoe at its righthand end by means of a binding post 132. The nose or forward tip of the shoe 123 is tapered as seen in plan in FIG. 10 and also is bowed arcuately upward as seen in elevation in FIG. 11. When the pile wire is inserted in the shed, the reed 52 beats up the pile wire so that the tip of the last-inserted wire 95a is in contact with the shoe. All previous pile wires 95, 95 have been pushed away from the fell so that they no longer contact the metal shoe 123 but rest on the top of insulating plate 130 shown clearly in FIG. 11. During normal operation of the pile wires, the last wire to be beaten up completes an electrical circuit through the nose of shoe 123 so that the loom is not stopped and normal operation continues. However, if one of the wires such as 95b does not penetrate the shed properly and the tip of the wire pierces the upper part of the shed as shown in FIG. 13 when this wire is beaten up, no contact will be made between the wire and the shoe 123. This gives a suitable indication on panel 56 and simultaneously stops the loom permitting the weaver to make the necessary correction.

An important feature of the present skim wire detector is the provision for displacement of the shoe in the event the shuttle 135 fails to seat all the way in the shuttle box before beat-up. Should this occur, the shuttle may strike the nose of shoe 123 as shown in FIG. 12. However, this action merely displaces the shoe 123 against the pressure of a tension spring 136 which is anchored at one end on a post 137 and at the other end on a pin 138 which extends through a slot 139 in bracket 121 and is connected to the shoe 123. It will be noted, however, that as long as the last pile wire 95a has been properly inserted in the shed, contact will still be made with the shoe 123 as shown in FIG. 12, so that the weaver will not get a false reading because of the improper shuttle action. This is provided for in another circuit so that the weaver accurately knows the exact reason for the malfunction.

The electrical sub-circuit for the skim wire detector is shown in FIG. 14, and it will be noted that this circuit utilizes two cams 140 and 141 which control switches 142 and 143 respectively. When cam 141 rotates so that cam follower 145 reaches the dwell of the cam, switch 143 is closed thus energizing relay R4 by completing a circuit through the shoe 123, pile wire 95a, to line 111. Relay contacts R4b are normally open so that this circuit will not be completed to energize relay R4 unless the pile wire 95a is in proper contact with shoe 123. This being the case, when relay R4 is energized, relay contacts R4b are closed to provide a holding circuit for relay R4 thus eliminating any chattering of the relay due to intermittent contact between the pile wire 95a and shoe 123. Simultaneously on the closing of contacts R4b, relay contacts R4a are also closed thus triggering the sensing circuit for completion by switch 142 controlled by cam 140 and cam follower 146. Closing of switch 142 with contact R4a closed completes the circuit from line 111 through testing switch 147 to line 148. Relay contact R4a is normally closed so that it is open whenever relay R4 is energized due to the completion of the circuit through normal positioning pile wire 95a. When the pile wire is not in place, relay R4 is not energized thus permitting the contact R4a to remain closed and completing the circuit when the sensing switch 142 closes. To recapitulate in the event pile wire 95a functions normally a circuit is completed through shoe 123 to energize relay R4 thus closing contact R4b and opening contact R4a. In the event that the circuit is not completed through pile wire 95a, relay R4 is not energized when switch 143 is closed; this permits contact R4a to remain closed and completes the sensing circuit through switch 142 to stop the loom. The construction of the skim wire detector not only prevents damage to the loom in the event of a shuttle malfunction, but also avoids improper indication due to vibration or failure to have the pile wire continue to make perfect contact until the sensing switches again determine the presence or absence of the wire. It will thus be seen that the use of two cams and the electrical circuitry in connection with the skim wire detector cooperate to provide an improved skim wire detecting device for carpet looms which are subject to substantial vibration and also to large amounts of fly which tend to render it difficult to provide proper electrical contacts in the area of the fell.

*The Cop Detector*

The mechanism for detecting the amount of filling in the shuttle is shown in FIGS. 15–21. Referring now to FIG. 15, the shuttle 135 is provided with a cop of weft yarn 150 which may or may not be wound on a tube 150a. The shuttle is projected back and forth across the lay 76 from the lefthand shuttle box 151 to the righthand shuttle box, not shown. The modification involved in the installation of the present detector consists in cutting out one side of the shuttle box at 152 and also providing an aligned aperture 153 in the shuttle itself. A detecting finger 154 is resiliently mounted in a housing 155 supported on the breast beam 156 of the loom. Finger 154 is provided with a blunt nose 157 which engages the filling 150 in the shuttle and without damage thereto. The finger 154 is guided in an aperture 160 of housing 155 and is bent in general U-shaped configuration around a roller 161 mounted on bracket 162 in the housing. A tension spring 163 is connected to the opposite end of the finger 154 and anchored on a post 164 as seen in FIG. 15. Inside the housing 155 the finger 154 is provided with a cam or switch contactor 165 which permits the finger to actuate a switch 167 through a contact roller 168. Switch 167 is conveniently mounted on the outside of housing 155 and is provided with electrical leads 169 and 170 (FIG. 20). As long as the cop is provided with sufficient filling 150, the finger 154 is displaced during the triggering of the electric circuit so that no contact occurs between cam 165 and roller 168. An empty cop 150a is shown in FIG. 16. In this condition finger 154 is not sufficiently displaced when the lay beats up so that contact is made between cam 165 and roller 168 thus closing switch 167 and giving a suitable indication to the weaver that the cop must be replaced.

As in the case with the skim wire detector, it is important to provide against mechanical damage to the loom in the event the shuttle 135 does not fully seat in the shuttle box. In this event, the finger 154 will not be aligned with the aperture 153 in the shuttle so that a maximum displacement of the finger takes place. This is provided for by the shape of the finger inside housing 155 so that spring 163 under these conditions is merely extended more than would be the normal extension for a full cop. Contact 165, however, does not strike the roller 168 so that there is no indication given that the cop is in need of replacement. This condition is shown in FIGURE 17 in which the shuttle 135 has not seated sufficiently far to permit the aperture 153 to become aligned with the aperture 152 in the shuttle box and also with finger 154. FIGURE 18 shows the lay 76 in its position partially on the beat-up and before it has made contact with the finger 154. FIGURE 19 shows the contact between the filling on the cop and finger 154 with a substantial supply of yarn on the cop.

Referring to FIGS. 20 and 21, the wiring circuits for the cop feeler include two cams 171 and 172 which actuate switches 173 and 174 respectively through cam followers 175 and 176. A relay 177 is energized when switch 174 is closed if switch 167 of the cop feeler is closed due to the absence of filling on cop 150a. Energization of relay 177 completes the circuit between lines 111 and 112 and closes a holding switch 180 in this circuit. Relay 177 also closes a switch 181 so that the stop motion circuit is triggered to give the proper indication and stop the loom when switch 173 is closed by cam 172. This, of course, completes a circuit between line 111 and line 182 through testing switch 183. The condition of switch 167 due to the empty cop 150a is shown schematically in FIG. 21.

Broken Filling Detector

In the event that one of the filling wefts breaks during the weaving of the pile fabric, I provide an improved device along the edge of the righthand selvedge of the loom for sensing this condition and consequently stopping the loom. Referring to FIGS. 22–25, the broken filling detector comprises a pivoting arm 185 fulcrumed on the loom at 186 and movable up and down in oscillating motion by means of a lever 187, a crank 188 pivoted at 189, and a cam 190. A cam follower 191 on the end of lever 188 is suitably positioned to depress the lever 185 when the cam follower 191 rides up on the high point 192 of the cam.

At the outer end of lever 185 I provide a pivoting angled finger 193 having a backwardly bending bar 194 which engages a filling or weft E after each pick. Finger 193 is pivoted at 195 and spring loaded by means of spring 196 adjustable with a thumb screw 197. Microswitch 198 is mounted at the end of lever 185 and is positioned to be actuated by the arm 200 of finger 193. As lever 185 dips downwardly towards the fell, a taut filling E engages the finger below bar 194 and pivots the finger in a counterclockwise direction about pivot 195 and against tension of spring 196. This maintains the arm 200 in an inoperative position out of contact with switch 198. In the event a broken filling occurs as shown in FIG. 23, the lever 200 is held against switch 198 due to the absence of the filling, and this condition closes switch 198 to provide an indication on the front panel 56 of the loom and consequently stop the loom. Referring to FIGS. 24 and 25, a line from power source 111 to line 201 is provided with two switches in series, one of these being switch 198 and the other being switch 202 which is actuated by means of cam 203. Simultaneously with the dipping of lever 188, cam 203 closes switch 202 to complete the circuit between line 111, testing switch 204, and line 201, provided switch 198 is also closed due to a broken filling. If no broken filling condition occurs, the circuit remains open and no indication takes place. The position of switch 198 under actuation of lever 200 in the event of a broken filling is shown schematically in FIG. 25. It will be noted that the sensing for the filling detector occurs during the beat-up of the reed 52 against the fell of the fabric as it is pushed over the breast plate. In this position the filling E is displaced from its normal position with sufficient tension to overcome the pull of spring 196 as shown clearly in FIG. 22.

Warp Tension Detector

The warp tension detector shown in FIGS. 26 and 27 is used on both broad and narrow looms and both Wilton and velvet looms. This detector is not intended to indicate slack tension in an individual warp yarn nor a single broken yarn, however, it is applied to the loom to determine whether the tension in a series of warp yarns, whether they be binder warps, stuffer warps, or pile warps, becomes less or more than predetermined optimum setting. In a velvet loom all of the warps are taken from large beams mounted on the back of the loom. However, in a Wilton loom, the pile warps are supplied from a creel so that the present attachment is intended to apply only to the warp yarns taken from beams and tensioned by means of a jumbo or whip roll. The construction of such jumbos is well known and briefly consists of a pair of bars, for example, 210, 211, which are rigidly mounted in a bracket 212 in turn journaled in the loom frame member 213. The warps, for example, chain warps C, supplied from a beam 80a mounted on the loom frame 82 are fed under shaft 211 then in back of the upper shaft 210. Due to the pivoting action of the jumbo, a predetermined tension may thus be applied to all of the warps fed from the beam by means of the jumbo lever 86a and suitable weights 88a suspended from the end thereof. The stuffer beam 81a is also loosely mounted in loom frame 82 and supplies the stuffer warp S to the stuffer jumbo shafts 221 and 222. In a similar manner tension is applied to the stuffer warps by means of the stuffer lever 85a and the stuffer weight 87a. Shafts 221 and 222 of the stuffer jumbo are likewise journaled in frame member 213 and at each end thereof are provided with a collar 225 having a cam 226. The binder jumbo likewise has a collar 227 and a cam 228. The position of cams 226 and 228 is such that when the proper tension is applied to the chain and stuffer warps by means of weights 87a and 88a, cams 226 and 228 actuate the cam followers 230 and 231 respectively for microswitches 232 and 233. In the event that excessive slack occurs in a set of warps as shown in FIG. 27, the cams 226 and/or 228 turn so that its associated cam follower actuates the switch thus causing a sensing circuit and indication. In FIG. 28 the electrical diagram for this circuit is shown in which the switch marked 232 is representative of the various jumbo switches. When this switch is closed by its associated cam, the circuit is closed between line 111, test switch 235, and line 236 thus giving a suitable indication on the panel 56 and stopping the loom.

In board Wilton or velvet looms it is desirable to have four switches for the chain and stuffer warps because the jumbos are split in the middle, there being a right and lefthand jumbo for each warp beam. In order to permit the weaver to tell which side of the loom or which jumbo is malfunctioning, there are sufficient switches 232, 233 to give an indication for each of the four jumbos in a Wilton loom and for each of the six or eight jumbos in a velvet loom depending upon whether one or two face warp beams may be used.

*Warp Drop Wire Motion*

In order to determine the presence of a broken warp end and particularly in the chain and stuffer in a Wilton loom, I also employ a series of conventional drop wires and suitable circuits shown in FIGS. 29–31. These individual drop wires comprise a slotted steel element 240 movable vertically over an insulated electrode 241 held in a cross bar 242. Each of the wires 240 is provided with an aperture 243 at its upper end through which the individual warp yarn W is threaded. In the event of a broken warp W or excessive slack tension in a particular warp as shown in FIG. 31, the drop wire makes contact between the wire and electrode 241 to complete a circuit between line 111 in FIG. 30, test switch 245, and line 246. The construction and operation of this drop wire circuit is well known and per se does not form a part of the present invention, but the circuitry in which the drop wires are integrated into the entire overall control system is an important feature.

*Pile Warp Tension Device for Velvet Looms*

The warp drop wire motion for the ground warps, namely, the stuffer and chain which has been described just above, is quite similar to the drop wire motion used for the pile warps in a velvet loom. Since velvet pile warps are customarily fed from a beam instead of a creel, the individual drop wires (FIGS. 33 and 34) are employed in the harness frames rather than at the rear of the loom as is the case with the other warp drop wires. Heddle drop wires of the type employed herein may be those shown and described in Batty et al. Patent No. 2,936,795. The pile drop wire heddle frames are provided with bars 250 which support an insulated electrode 251 and which extend through elongated slots in steel elements 252. These elements form the upper part of each heddle 253 which is provided with an eye 254 through which the pile yarns P are threaded. In the event that one of the pile yarns P is broken or has excessive slack tension as shown in FIG. 34, the plate 252 is not raised above the electrode 251 so that electrical contact is made between the bar 250 and the electrode as shown in FIG. 34. The timing of this condition to trigger the circuit is provided by means of cam 255 which actuates a switch 256 through a cam follower 257. The line 111 is connected to the electrode 251 and the bar 250 is connected to the testing switch 258 through the cam actuated switch 256. If the circuit is completed through the electrode 251, bar 250, and switch 256, and line 259, the proper stop motion devices are actuated and suitable indication given on the panel 56.

*Pile Warp Tension Device for Wilton Looms*

In the case of a Wilton loom in which the pile yarns or warps are supplied from a creel as distinguished from a beam, I employ individual drop wires for detecting broken or slack ends at the creel. FIG. 35 shows a schematic representation of a single yarn package 269 in which the yarns forming the pile are drawn from a creel. Such a yarn package 269 is illustrative of one of the many packages from which each individual pile yarn P is drawn. The yarn from package 269 is fed over a plurality of yarn guides 270, 271, and 272 through a tensioning arm 273 which is adjustably pivoted at 274 and is provided with an aperture 275 through which the pile yarn P is threaded. At a point adjacent the creel, pile yarn P is also threaded through the eye 276 of a conventional drop wire 277 positioned over an electrode 278 mounted in an insulated bracket 279. In the event one of the pile yarns P breaks or the slack becomes excessive due to the weight of tension arm 273, the drop wire 277 lowers to make contact with the electrode 278 as shown in FIG. 39. In order to facilitate the weaver's locating the loosely tensioned or broken end in addition to the indication at panel 56, I provide a series of lights for each creel section. These lights are shown in FIG. 36 and have in the particular case a plurality of switch elements indicated generally at 280, 280 for each light 281, 281. The auxiliary creel lights 281, 281 are also tied into the main panel box 56 through suitable leads 282, 282.

It will be understood that the lights 281 are conveniently mounted on or above each creel section so that a broken end showing upon the panel can be additionally traced to the proper creel section, thus enabling the weaver to replace the broken end in a minimum of lost time. The circuitry for the creel drop wires is shown in FIGS. 37 and 38. In this case when a circuit is completed between leads 111 and line 283, a relay 284 is energized which in turn closes relay contacts 285 and 286 in FIG. 38. The closing of relay contact 285 completes the circuit to the test switch and line shown in FIG. 45, whereas the relay contact 286 closes the circuit between relatively higher voltage lines 111a and 112a to light the particular lamp 281 in the affected circuit.

It must be understood that I have described individual control and malfunction detecting devices for various parts of the loom which may be so integrated and connected electrically to eliminate any false stops, false indications, and to greatly expedite the operation of many looms by much fewer weavers.

*Modified Cop Feeler*

A modified cop feeler is shown in FIGS. 40 and 41 in which the finger 290 is of somewhat modified configuration and the finger makes contact with the switch actuator without the interposition of a cam. In the form of FIG. 40, the finger is movable in a housing 292 and over a roller 293 journaled in bracket 294. A tension spring 295 anchored at 296 controls the movement of finger 290 and urges it into a contact position with the contact 297. This contact is electrically insulated from housing 292 by means of a washer 298 and an electrical lead 299 is connected to the outside of the contact by means of a nut 300. In all other respects, the cop feeler of FIG. 40 operates the same way as the cop feeler of FIG. 15, a modified form, however, being somewhat more compact and less subject to disturbances due to the vibration of the loom and also more easily mounted on the breast plate.

FIG. 41 shows the position of finger 290 during the beat-up with the cop full or partially full so that no contact is made, and in the maximum displaced position of FIG. 41, finger 290 is illustrated in the position to which it would be displaced if the shuttle did not fully seat in the shuttle box. This is comparable to the showing of FIG. 17.

*The Electrical Circuitry and Cams*

Referring now to FIGS. 42–46, a flexible shaft 305 is connected to a main driving shaft on the loom and is directed to the switch box 306 through a suitable sheath 307. The shaft 305 drives a camshaft 308 journaled at 309, 309 in the switch box. The various cams described above are keyed to camshaft 308 and suitably actuate their associated switches through suitable cam followers as shown in FIG. 44. The reference numbers applied to the cams and switches in FIGS. 43 and 44 correspond to the individual cams and switches described in connection with the various malfunction detecting devices. Cams 310 and 311, with their associated switches 312 and 313, are spares.

FIG. 42 shows a modified switch box and dual camshaft which is used for a one-shot loom. In this situation some of the cams and switches are driven at a 2:1 ratio with respect to shaft 305 by means of 2:1 gears 315 and 316. The cams 141, 171, 172, and 255 are driven from the high speed camshaft 317 which is keyed to gear 316 and journaled in the second switch box 318 at 319 and 320. Cams 203, 140, 107 310, and 311 still operate at the 1:1 ratio on camshaft 308 as described in connection with FIG. 43.

The Testing Circuits

Each of the circuits described above can be tested by means of the various testing switches 116, 147, 183, 204, 235, 245, and 258. In FIG. 45, each one of these switches is designated with the letters TS since this portion of the circuit is the same for each of the testing switches as specified above. It will be understood that in FIGS. 1 and 46 the general number 57 has been given to each of the testing switches but that the individual switches in their particular circuits are separately numbered. The actual location of the specific switches on the panel 56 is, of course, immaterial as long as they are appropriately designated. With the switch thrown in the operating position as shown in FIG. 45, a circuit is completed from line 111 and whatever intermediate switches may be used to a line 325, line 326, relay 327, to line 112. Energization of relay 327 closes relay contacts 329 and 330 which complete a holding circuit for the relay. The appropriate panel light 58 will remain lit until the weaver breaks the circuit to relay 327 by opening one of the switches TS (57). With the closing of contacts 329 due to energization of relay 327, a circuit is completed between lines 111 and 112 to energize relay 331 which actuates the usual stopping and braking circuits for the loom to be described more fully hereinafter. There are separate contacts 329 for each of the stop motion or malfunctioning devices all tied between lines 112 and line 332. On the closing of any of the individual relay contacts 329 a circuit is completed to relay 331. Line 112 is also provided with a plurality of re-set switches 340, 340a, and 340b conveniently located on the loom.

Schematic Loom Circuitry

Referring now to FIGURE 46, the malfunction or stop motion circuits forming an important part of the invention together with the conventional loom control mechanisms are illustrated schematically to show the correlation thereof. Since the conventional control mechanisms for a loom are well known and form no part of the present invention, it is believed a detailed description of this circuitry is unnecessary in the interests of clarification. The re-set switches 340, 340a, and 340b are tied into the control panel 56. Likewise the main power source feeds into the panel box 56 through a transformer 341 and the main disconnect switch 342. The magnetic contactors for the loom are shown schematically at 343 and the start, stop, and reverse switches are shown at 344. Looms of the type described herein are provided with a manual control handle often referred to as the shipper handle which operates a suitable shut-off switch 345 which in turn stops the drive of the loom and which is actuated when relay 331 is energized. This relay by-passes the operating position of the shipper handle so that the switch 345 may be actuated either by the energization of the relay 331 or by manual movement of the shipper handle. The power knock-off switch 346 is also a conventional item on looms and may be controlled by other stop motion devices such as, for example, suitable feeler mechanism in the shuttle boxes, etc. With the actuation of either switch 345 or 346 a suitable clutch on the loom may be disengaged and the brake 347 applied or the main loom motor 348 may be stopped. When the shipper handle is thrown to the off position manually, a relay, not shown, is energized to open the normally closed contacts 350 in line 351 (FIG. 45). This breaks the holding circuit to any of the relays 327 which may have been held energized due to the operation of a particular stop motion. Such movement of the shipper handle thus clears all of the stop motion circuits. The individual circuits may be cleared or tested manually by the weaver by throwing the individual testing switch 57 to connect lines 326 and line 111 through line 352. In this way the relay 327 in each circuit can be energized regardless of the position of contacts 330 or 350 to check both the actuation of the relay and the light 58 in the particular circuit. Switches 57 are provided with an intermediate off position as shown in FIG. 45.

I have thus provided an improved stop motion circuit system for large looms, particularly Wilton and velvet carpet looms. In addition, the invention pertains to improved stop motion devices which are so designed that false stops are eliminated. The weaver is quickly apprised of the precise location of the malfunction so that a correction may be expeditiously made without the necessity for visual inspection of all parts of the loom and the yarns being woven.

Having thus described my invention, I claim:

1. In pile textile wire looms having a plurality of warp supplies, means for feeding warps from said warp supplies to a warp shed, a shuttle for carrying filling wefts back and forth through said warp shed, and a wire motion for inserting pile wires into said shed, the combination which comprises a plurality of indicating lights visible from the front of said loom, a plurality of switches on said panel, means for detecting the absence of a filling weft in the shed, means for deterring the absence of filling weft in said shuttle, means for detecting improper tension in said warps, a switch operable by each of said detecting means, electrical circuits between each of said switches and the lights for indicating the actuation of each one of said detecting means, a wire slide, a plunger positioned to oscillate back and forth across a portion of said wire slide, a solenoid for oscillating said plunger, a cam driven by the loom, a switch operable by said cam, electrical connections between the switch and the solenoid for moving the plunger in timed relation to the movement of wires on the wire slide, and a cam on the plunger positioned to actuate the detecting means switch to close the electrical circuits and to indicate the position of the plunger in timed relation to the movement of the first cam.

2. In pile textile wire looms having a plurality of warp supplies, means for feeding warps from said warp supplies to a warp shed, a shuttle for carrying filling wefts back and forth through said warp shed, and a wire motion for inserting pile wires into said shed, the combination which comprises a plurality of indicating lights visible from the front of said loom, a plurality of switches on said panel, means for detecting the absence of a filling weft in the shed, means for detecting the absence of filling weft in said shuttle, means for detecting improper tension in said warps, a switch operable by each of said detecting means, electrical circuits between each of said switches and the lights for indicating the actuation of each one of said detecting means, a bracket mounted on the loom adjacent one selvedge of the fabric being woven and in registry with the fell thereof, a flat shoe slidably mounted on said bracket, means for resiliently urging said flat shoe to an extended position on the bracket, a dielectric face for a portion of said shoe, an exposed electrically conductive surface at the tip of said shoe in registry with the tip of a pile wire properly positioned in the shed, and a cam rotatably timed with the sequential insertion of each pile wire to operate the switch and the electrical circuits when a pile wire makes contact with the tip of the shoe.

3. In pile textile wire looms having a plurality of warp supplies, means for feeding warps from said warp supplies to a warp shed, a shuttle for carrying filling wefts back and forth through said warp shed, and a wire motion for inserting pile wires into said shed, the combination which comprises a plurality of indicating lights visible from the front of said loom, a plurality of switches on said panel, means for detecting the absence of a filling weft in the shed, means for detecting the absence of filling weft in said shuttle, means for detecting improper tension in said warps, a switch operable by each of said detecting means, electrical circuits between each of said switches and the lights for indicating the actuation of each one of said detecting means, a wire slide, a plunger positioned to oscillate back and forth across a portion of said wire slide, a solenoid for oscillating said plunger, a cam driven by the loom, a switch operable by said cam, electrical connections between the switch and the solenoid for moving the plunger in timed relation to the movement of wires on the wire slide, a cam on the plunger positioned to actuate the detecting means switch to close the electrical circuits and to indicate the position of the plunger in timed relation to the movement of the first cam, a bracket mounted on the loom adjacent one selvedge of the fabric being woven and in registry with the fell thereof, a flat shoe slidably mounted on said bracket, means for resiliently urging said flat shoe to an extended position on the bracket, a dielectric face for a portion of said shoe, an exposed electrically conducting surface at the tip of the said shoe in registry with the tip of a pile wire properly positioned in the shed, and a second cam driven by the loom and rotatably timed with the sequential insertion of each pile wire to operate a second detecting means switch and the associated electrical connections between said second switch and the shoe for completing a circuit to one of the lights when a pile wire fails to make contact with the tip of the shoe.

4. In a control system for a textile pile wire loom having a plurality of warp supplies, means for feeding warps from said warp supplies to a warp shed, a shuttle for carrying filling wefts back and forth through said warp shed, and a wire motion for inserting pile wires into said shed, the combination which comprises a framework for said loom, an indicating panel mounted on said framework and accessible from the front of the loom, a plurality of indicating lights on said panel, a plurality of switches on said panel, means for detecting the absence of a filling weft in the shed, means for detecting the absence of filling weft in said shuttle, means for detecting improper tension in said warps, a switch operable by each of said detecting means, electrical circuits between each of said switches and the lights for indicating the actuation of each one of said detecting means, a cam driven by the loom, a switch operable by said cam, a solenoid energized by closing of said switch, a wire slide on the loom over which pile wires are inserted and withdrawn, a plunger operable by said solenoid across a portion of said wire slide, a cam on said plunger for operating the detecting switch, and a test switch in the electrical circuits.

5. An improved miss wire detector assembly for a pile wire loom which comprises a wire slide along which a series of pile wires are individually inserted and withdrawn, a bracket secured to said wire slide at approximately right angles thereto, a plunger mounted in said bracket, a solenoid for moving said plunger from a retracted position clear of the path of a wire in said wire slide to a detecting position in the path of a wire in said wire slide, a cam on said plunger, a switch mounted in the bracket and positioned to be actuated by said cam in accordance with the position of the plunger, at least one overriding spring on said plunger providing a resilient driving connection between the solenoid and the plunger, a second cam operating in timed relationship with the movement of the wires in the wire slide, a switch actuated by said last-named cam, and electrical connections between the cam switch and the solenoid for oscillating the solenoid in the bracket in timed relation with the movement of wires in the wire slide.

6. A skim wire detector assembly for a pile fabric loom which comprises a bracket secured to the breast plate of the loom adjacent one transverse edge thereof, a shoe slidably secured to said bracket, one end of said shoe extending beyond and laterally in registry with the fell of a pile fabric being woven in said loom, an electrically conductive tip on said shoe, a dielectric surface on the top of said shoe, a spring for resiliently retaining the shoe in a forward position on the bracket, a cam rotating in timed relation with the loom, a switch operable by said cam, an indicating light mounted on the loom, and electrical connections between the cam, the switch, and the indicating light for detecting the presence of an improperly positioned pile wire after each wire insertion.

References Cited in the file of this patent

UNITED STATES PATENTS

| | | |
|---|---|---|
| 1,815,277 | Spendlove | July 21, 1931 |
| 1,961,400 | Spendlove | June 5, 1934 |
| 2,051,902 | Rossmann | Aug. 25, 1936 |
| 2,353,540 | Benson | July 11, 1944 |
| 2,439,031 | Wilson | Apr. 6, 1948 |
| 2,453,145 | Matweeff | Nov. 9, 1948 |
| 2,594,209 | Porter | Apr. 22, 1952 |
| 2,675,029 | Butler et al. | Apr. 13, 1954 |
| 2,819,737 | Opletal | Jan. 14, 1958 |
| 2,881,807 | Moon | Apr. 14, 1959 |
| 3,008,495 | Hyde | Nov. 14, 1961 |
| 3,028,883 | Urquhart | Apr. 10, 1962 |
| 3,049,152 | Batty et al. | Aug. 14, 1962 |